July 9, 1963 W. K. THEILHEIMER 3,096,639

METHOD AND APPARATUS FOR COMPENSATING FOR ECCENTRICITY

Filed Feb. 24, 1960 2 Sheets-Sheet 1

INVENTOR.
WERNER THEILHEIMER
BY Henry L. [signature]
ATTORNEY

METHOD AND APPARATUS FOR COMPENSATING FOR ECCENTRICITY
Filed Feb. 24, 1960 2 Sheets-Sheet 2
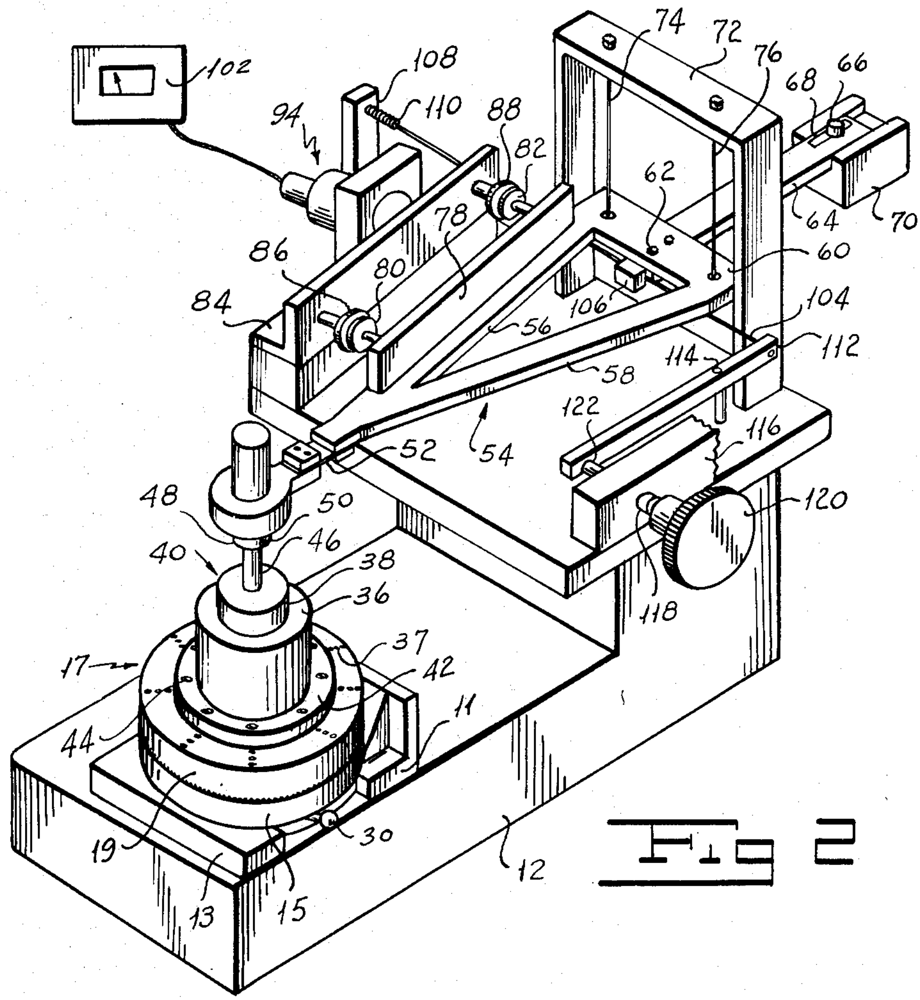
Fig 2
Fig 3
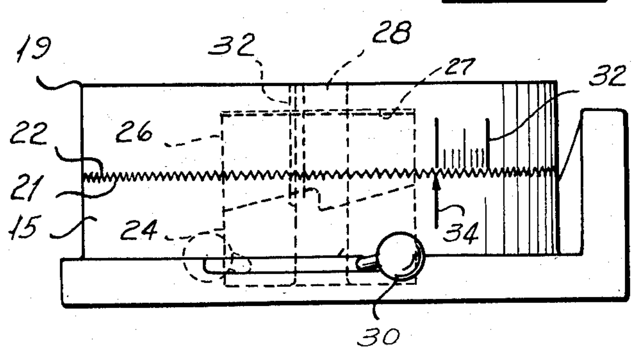
INVENTOR.
WERNER THEILHEIMER
BY Henry L. Shenier
ATTORNEY United States Patent Office 3,096,639

Patented July 9, 1963

3,096,639

METHOD AND APPARATUS FOR COMPENSATING FOR ECCENTRICITY

Werner K. Theilheimer, Bayside, N.Y., assignor to United Aircraft Corporation, East Hartford, Conn., a corporation of Delaware Filed Feb. 24, 1960, Ser. No. 10,791
9 Claims. (Cl. 73—1)

My invention relates to a method and apparatus for compensating for eccentricity and more particularly to an improved apparatus and a method for producing a precise relative angular displacement between a pair of relatively rotatable members.

It is often necessary to produce a precisely known relative displacement between a pair of relatively rotatable members. For example, in testing the electrical characteristics of devices such as synchros, it is necessary to know accurately the relative angular position of the rotor with reference to the stator at various points in order that the electrical characteristics of the device be correctly correlated with the relative position of the rotor and the stator.

Many indexing devices are known in the prior art for producing an accurate displacement of an indexing head from a reference position. It would be thought that by mounting one of a pair of relatively movable members on the head and by indexing the head while holding the other one of the members against rotation that the relative angular displacement of the relatively rotatable members would be precisely the same as the angular displacement of the head. Such, however, often is not the case. Owing to eccentricity in the mounting of one of the members on the head or owing to rotor shaft eccentricity or rotor shaft wobble built into the device, the relative angular displacement of the members does not precisely equal the angular displacement of the head from its reference position. As a result, in the testing of synchros, for example, electrical characteristics of the device are not properly correlated with the relative angular position of the rotor with reference to the stator and the test is entirely unsatisfactory.

In such installations an eccentricity error of as little as five millionths of an inch in one inch results in an angular error of one second of arc. An error of as much as three ten-thousandths of an inch in one inch causes an angular error of one minute of arc. The only way in which a proper test can be made under the conditions outlined above is to correct for eccentricity at each relative position of the rotor and the stator. In the prior art it has been suggested that these angular deviations resulting from eccentricity be compensated for by use of an autocollimater, which is a telescopic device employing optical methods of measuring the deviation. While this method of compensating for errors introduced by eccentricity accomplishes the desired result, it is so time consuming as to be entirely impractical for production use.

I have invented a method and apparatus for producing precisely known relative angular displacement between a pair of relatively rotatable members. My method and apparatus compensate for eccentricity in mounting the device on an indexing head and rotor shaft eccentricity or rotor shaft wobble built into the device. My method and apparatus permit devices such as synchros to be tested in a rapid and expeditious manner precisely to correlate the electrical characteristics of the device with the relative angular position of the rotor with reference to the stator.

One object of my invention is to provide a method and apparatus for compensating for eccentricity which overcome the defects of methods and apparatus of the prior art.

Another object of my invention is to provide a method and apparatus for producing a precisely known relative rotary displacement between a pair of movable members.

A further object of my invention is to provide a method and apparatus for compensating for eccentricity which permits devices such as synchros to be tested in a rapid and expeditious manner while precisely correlating the electrical characteristics of the device with the relative angular position of the rotor with respect to the stator.

Other and further objects of my invention will appear from the following description.

In general my invention contemplates the provision of apparatus including an indexing head carrying a first one of a pair of relatively rotatable movable members and adapted to be accurately located with respect to a reference position. A sensing means coupled to the second one of the pair of the relatively rotatable members produces an output signal representing the difference between the relative angular displacement of the relatively movable members and the angular displacement of the indexing head from its reference position. My apparatus has means for moving the second one of the members through an angle equal to the angle indicated by the error signal to reduce the error signal to zero and thus to produce the desired precisely known relative rotation between the movable members.

In the accompanying drawings which form part of the instant specification and which are to be read in conjunction therewith and in which like reference numerals are used to indicate like parts in the various views:

FIGURE 2 is a perspective view of one form of my apparatus for compensating for eccentricity.

FIGURE 3 is a fragmentary view showing the details of one form of indexing head which may be used with my apparatus for compensating for eccentricity.

FIGURE 4 is a schematic view of the electrical circuit of my apparatus for compensating for eccentricity.

Figure 1:
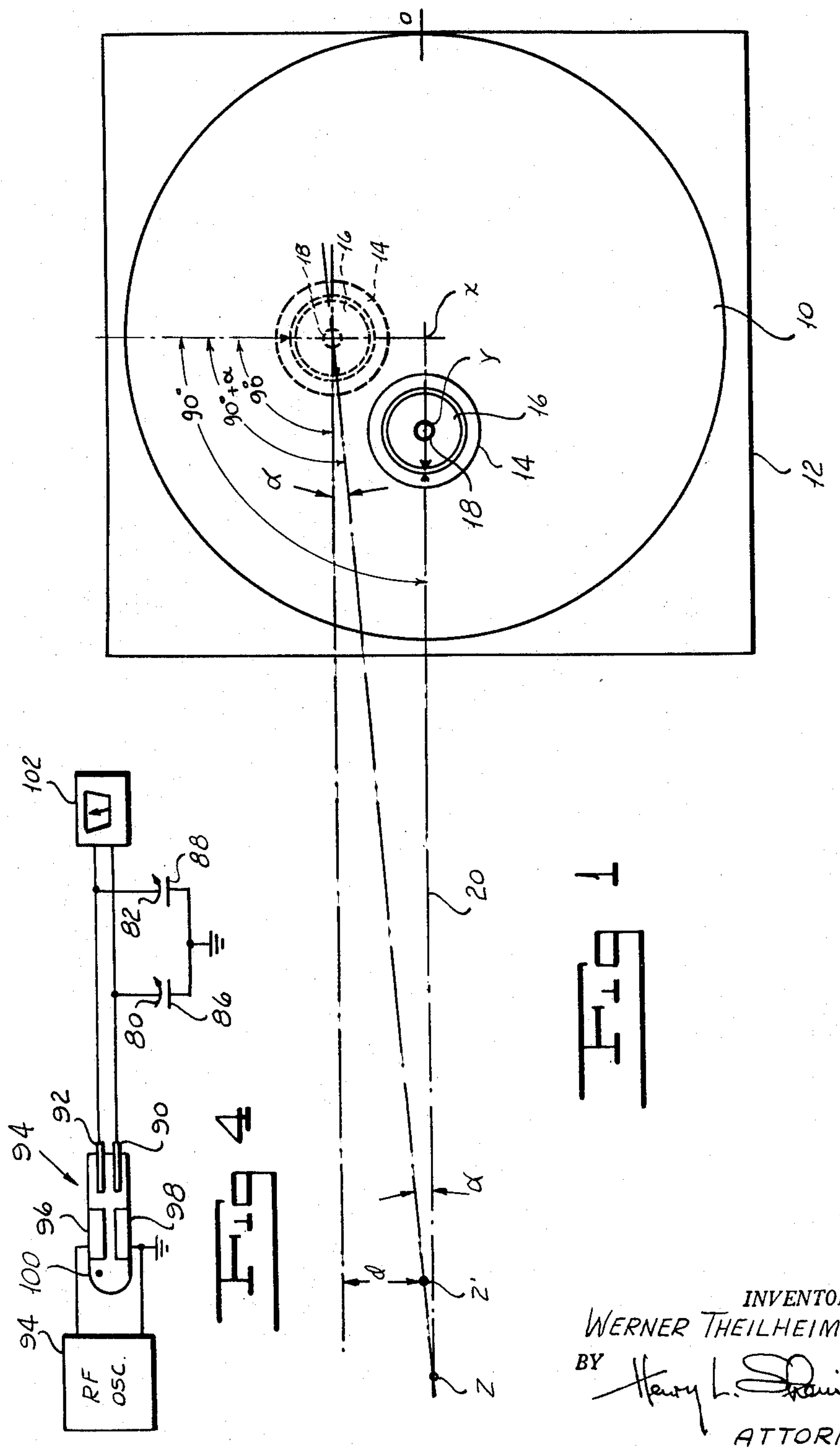
FIGURE 1 is a diagrammatic view illustrating the principle of operation underlying my method and apparatus for compensating for eccentricity.

Referring now to FIGURE 1 of the drawings, an indexing head 10 is adapted to be accurately positioned with reference to a stationary table or the like 12 about a center of rotation X. By suitable means to be described in detail hereinafter, one member 14 of a pair of relatively rotatable members 14 and 16 such, for example, as a snychro stator and rotor is mounted on head 10 for movement therewith. The other member or rotor 16 has a shaft 18 with an axis Y. For purposes of explanation, I assume that the device including the stator 14 and the rotor 16 is eccentrically mounted on the table 10 with the axis Y displaced from the axis X. It will be understood, of course, that the amount of eccentricity of axis Y with respect to axis X is greatly exaggerated over that which might occur in practice owing to human error or the like. A beam indicated schematically by the line 20 in FIGURE 1 is connected to shaft Y for movement therewith. As will be apparent from the description of my apparatus given hereinafter, beam 20 is suspended to permit it to move axially of itself while at the same time pivoting about some point Z along its length.

Let us now assume that the head 10 is indexed in a clockwise direction as viewed in FIGURE 1 through a precisely known angle such, for example, as 90°. It will be apparent that upon this movement of the indexing head, rotor 16 is angularly displaced with respect to the stator 14. However, owing to the eccentricity of axis Y with reference to axis X, a relative clockwise rotation of the stator 14 with respect to rotor 16 of 90° plus $\alpha$ is produced as they arrive at the broken line position shown in FIGURE 1 upon completion of the indexing movement. At the same time the longitudinal axis of the beam 20 makes the angle $\alpha$ with the original direction of orientation of the beam before indexing. In this condition of the apparatus, point Z can be represented as the point Z′ shown in FIGURE 1. If now point Z is moved through a distance approximately equal to the distance *d* shown in FIGURE 1, then the longitudinal axis of the beam 20 will extend in a direction parallel to that direction in which it originally extended. At the same time the rotor 16 is moved through the angle $\alpha$ in a direction opposite to the direction of its relative rotation upon indexing movement of the head 10 to cause the relative displacement of the rotor with respect to the stator to be precisely equal to the angular displacement of the head 10 from its reference position which in the particular example considered is 90°.

Referring now to FIGURES 2 and 3 of the drawings, in one embodiment of my apparatus for compensating for eccentricity I secure a bracket 11 to a supporting table 12 by any suitable means. The base 13 of bracket 11 supports the stationary plate 15 of an indexing table assembly, indicated generally by the reference character 17. The assembly 17 includes a second or movable plate 19 formed with a ring of teeth or serrations 21 adapted to intermesh with similar teeth or serrations 22 formed at the upper face of plate 15 accurately to locate the plates with reference to each other. This structure of plates 15 and 19 just described affords a means by which a member carried by the plate 19 can be accurately indexed with reference to a position on plate 15. This apparatus 17 includes a simple mechanism by means of which the plates may be separated to permit plates 17 and 19 to be moved relative to each other. A pair of respective cam members 24 and 26 surround a shaft 28 carried by the base of bracket 11. A handle 30 secured to the cam 24 is adapted to be moved to rotate cam 24 around the shaft 28. A key or the like 32 prevents rotary movement of cam 26 on the shaft 28 while at the same time permitting the cam to be moved upwardly along the shaft. Thus when the handle 30 is moved to the left from the position shown in FIGURE 3, cam 24 rotates with respect to shaft 28. As cam 24 rotates in this manner, it moves cam 26 upwardly. It will be understood that the plate 15 is formed with an opening through which the assembly of cams 24 and 26 extends. Conveniently the underside of plate 19 is formed with a recess 27 to permit the plate to rest on cam 26 when the cam is raised.

When, in the manner described hereinabove, handle 30 is moved to the broken line or unlocking position, cam 26 moves upwardly on shaft 28 to engage the base of recess 27 to lift the plate to a position at which the teeth 21 and 22 are out of mesh. In this condition of the apparatus plate 19 may be rotated to an approximate relative position with respect to plate 15. When handle 30 is returned to its initial position, the teeth 21 and 22 again mesh to lock plate 19 on plate 15 with an extremely high degree of accuracy. A scale 32 on plate 18 cooperates with a reference mark 34 on plate 14 to indicate the relative position of the two plates.

The plate 18 is provided with a plurality of holes 37 which permit members to be mounted on the plate. Indexing tables of this nature are known in the art. One type of this form of indexing tables is shown in Bulletin No. X59 of the Michigan Tool Company, 7171 East McNichols Road, Detroit, Michigan.

A holding fixture 36 carries for movement therewith one element, such as a stator 38, of the device, such as a synchro, indicated generally by the reference character 40, under test. I mount the fixture 36 on the movable plate 19 by any suitable clamping arrangement known to the art such, for example, as by clamping a flange 42 formed on the fixture to the plate 19 by bolts 44 screwed into the plate 19. I so mount the fixture 36 on the plate 19 that the center of rotation of the plate 19 corresponds as closely as is possible to the axis of the shaft 46 of the device under test.

I secure a shaft holding fixture 48 to the shaft 46 by any suitable means such, for example, as by use of a set screw 50. A thin flexible reed 52 connects the shaft holding fixture 48 to a triangularly shaped beam, indicated generally by the reference character 54, having legs 56 and 58 and having a base 60. Any suitable means such as screws 62 secure an arm 64 to the base 60. A screw 66 passing through a slot 68 at the end of arm 64 remote from the base 60 clamps a counterweight 70 to the arm 64.

I suspend beam 54 from a bridge structure 72 by means of a pair of spaced wires 74 and 76 extending between the bridge and the base 60 of the beam 54.

From the structure thus far described, it will be apparent that when the plate 19 is indexed, stator 38 rotates with reference to the shaft 46 which is held in the fixture 48. If the axis of shaft 46 coincides precisely with the axis of rotation of plate 19, the shaft axis will not be displaced with respect to the axis of rotation of the plate. If, however, owing to eccentricity in the mounting of the stator 38 on the plate 19 or owing to eccentricity or wobble of the shaft 46 with respect to the stator 38, axis Y of the shaft does not coincide with the axis X of rotation of the plate 19. Upon the occurrence of an indexing movement of plate 19, axis Y is displaced with respect to axis X and the longitudinal axis of the beam 54 extends in a direction making the angle $\alpha$ with reference to the original direction of orientation of the beam.

I provide my apparatus with a means for sensing a deviation of the beam of the type described above. Leg 56 of the beam 54 carries a bracket 78 which supports a pair of movable capacitor plates 80 and 82. A bracket 84 carried by the table 12 supports a pair of fixed capacitor plates 86 and 88.

As will be explained hereinafter, in the initial position of the beam 54, the respective plates of the pairs of plates 80 and 86 and 82 and 88 are equidistant from each other. Referring now to FIGURE 4, I provide a means for producing an electrical signal indicating the change in relative capacitance of the pairs of plates 80 and 86 and 82 and 88 occasioned by a deviation of the beam 54 from its initial position in a manner to be described. The respective fixed capacitor plates 86 and 88 are connected to ground. I connect the respective movable capacitor plates 80 and 82 to the electrodes 90 and 92 of an ionization transducer, indicated generally by the reference character 94. The transducer 94 is of a type known in the art such, for example, as that shown and described in U.S. Patents No. 2,696,566 and No. 2,696,584. As is known in the art, a radio frequency oscillator 94 applies an alternating current voltage across a pair of external transducer electrodes 96 and 98 carried by the envelope 100 of the electrode. This alternating current voltage ionizes the gas within the envelope 100 and a small portion of this excitation appears across the capacitors formed by the pairs of plates 80 and 86 and 82 and 88. With the plates of the two pairs equidistant, the A.C. voltage across the two capacitors is equal. When, however, an A.C. voltage difference exists between the two electrodes 90 and 92, a difference in migration of the electrodes in the gas occurs resulting in a D.C. potential difference between the electrodes 90 and 92 which is very much larger than the alternating current signal. In one form of my apparatus I connect a meter 102 between the electrodes 90 and 92 to indicate this D.C. potential. As will be described hereinafter, if desired, I could apply this D.C. potential to a servomotor for balancing my system.

Referring again to FIGURE 2, I clamp a wire 104 at a point intermediate its length to the arm 64 by means of a clamp 106. A spring 110 secures one end of the wire to an upright 108 on the table 12. I connect the other end of the wire to a lever 112 supported for pivotal movement on a pin 114 carried by the table 12. A bracket 116 on the table 12 carries a micrometer screw 118 adapted to be turned by means of a knob 120 carried by the screw.

A pin 122 formed on the end of screw 118 remote from knob 120 bears against the end of lever 112 remote from the wire 104. From the structure just described, it will be seen that the position of the beam 54 can be adjusted by the action of micrometer screw 118 against the spring 110.

In use of my method and apparatus for compensating for eccentricity when, for example, it is desired to test a device such as a synchro 40 having a stator 38 and a rotor shaft 46, I place the stator 38 in the fixture 36 carried by the indexing plate 19 in such a manner that stator 38 rotates with the fixture. As has been explained hereinabove, I so mount the fixture 36 on the plate 19 that its central axis coincides as closely as is possible with the axis of rotation of the plate 19. When the synchro stator 38 has thus been placed in the fixture 36, I secure the fixture 48 to shaft 46 by any suitable means such as by a set screw 50. When all this has been done and with the plate 19 in its zero position with reference to the mark 34, I adjust micrometer screw 118 to a position at which the plates of the pairs of plates 80 and 86 and 82 and 88 are equidistant so that the reading of the meter 102 is at a null. With the parts so arranged, the apparatus is ready to begin a test. I next actuate arm 30 to separate plates 15 and 19 through a distance which moves the serrations or teeth 20 and 22 out of engagement and I rotate plate 19 through approximately the distance stator 38 is to be moved for the first measurement to take place. I then return arm 30 to its locked position to permit teeth 20 and 22 to come into engagement accurately to lock plate 19 with respect to plate 15.

When the steps outlined above has been accomplished, I note the reading of meter 102. If, owing to some eccentricity in the mounting of the stator 38 on the plate 19 or owing to eccentricity or wobble of the axis of shaft 46 with respect to the axis of rotation of plate 19, the axis Y has moved with respect to the axis X, then beam 54 has pivoted about some point along the length of its axis through angle $\alpha$. When this occurs, the capacitance between plates 80 and 86 differs from the capacitance between plates 82 and 88 and ionization transducer 94 has a direct current signal between its electrodes 90 and 92 which is a measure of the amount and of the direction of deviation of the beam. I then turn knob 120 through a distance sufficient to move the beam back to its initial position at which the capacitances between the respective pairs of capacitance plates are equal and the meter reading is at the null. This movement of the beam rotates shaft 46 through the angle $\alpha$ to cause the relative rotation between stator 38 and the shaft 46 to be precisely equal to the angle through which plate 19 has been indexed.

The operation described above may be repeated in as many positions of the plate 19 with respect to the plate 15 as is desired. In each of the relative positions reading of meter 102 is noted and knob 120 is turned through such a distance as will return the meter to its null.

While I have described the use of my apparatus and method as involving an observation of the reading of meter 102 and a manual turning of the knob 120 to bring the meter to its null position, it will readily be appreciated that the output signal of the ionization transducer could easily be applied to a servomotor for automatically driving the micrometer screw 118 until the error signal was zero. Similarly, the operation of stepping the indexing head or plate 19 to the various positions at which observations of the electrical characteristics of the synchro 40 are to be made could be made automatic by use, for example, of pneumatic pistons and cylinders together with a ratchet drive.

It will be seen that I have accomplished the objects of my invention. I have provided a method and apparatus for compensating for eccentricity. My method and apparatus are adapted to produce a precisely known relative rotary displacement between a pair of relatively rotatable members. My method and apparatus are especially adapted for use in testing synchros since they permit the precise relative angular position of the rotor and stator to be correlated with the electrical characteristics of the device. My method and apparatus permit relatively rotatable members to be indexed to a number of precisely known relative positions in an extremely rapid and expeditious manner.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for measuring eccentricity between the rotor and stator of an electrical device, said rotor having an axis of relative rotation with respect to the stator including in combination a support, means mounting one of said rotor and stator for rotary movement on said support, means for moving said mounting means through a precisely known angular displacement with respect to said support and means responsive to displacement of said axis of relative rotation upon movement of said mounting means for sensing the difference between the relative angular displacement of the rotor in respect to the stator and the angular displacement of said mounting means on said support as a measure of said eccentricity.

2. Apparatus for measuring eccentricity between the rotor and stator of an electrical device, said rotor having an axis of relative rotation with respect to the stator including in combination a support, means mounting a first one of said rotor and stator for rotary movement on said support, means for initially orienting the second one of said rotor and stator to a reference direction with respect to said support, means for moving said mounting means through a precisely known angle with respect to said support, and means for measuring angular displacement of said orienting means from said reference direction in response to movement of said mounting means to provide a measure of the eccentricity between said rotor and stator.

3. Apparatus for compensating for eccentricity between a pair of relatively rotatable members having an axis of relative rotation including in combination a support, means mounting a first one of said members for rotary movement on said support, means for initially orienting a second one of said members to a reference direction with respect to said support, means for moving said mounting means through a precisely known angle with respect to said support, means for sensing displacement of said orienting means in response to movement of said mounting means, means responsive to said sensing means for producing a signal indicating the eccentricity between said members and means for actuating said orienting means to restore said second member to said reference direction to reduce said signal to zero.

4. Apparatus for measuring eccentricity between the rotor and stator of an electrical device, said rotor having an axis of relative rotation with respect to said stator including in combination a support, means mounting a first one of said rotor and stator for rotary movement on said support, a beam, means mounting said beam for angular movement with respect to said support, means connecting said beam to the second one of said rotor and stator, means for moving said mounting means through a precisely known angular displacement with respect to said support and means for sensing angular displacement of said beam in response to movement of said first one of said rotor and stator.

5. Apparatus for compensating for eccentricity between a pair of relatively rotatable members having an axis of relative rotation including in combination a support, means mounting one of said members for rotary movement on said support, a beam, means mounting said beam for movement about a pivot point with respect to said support, means connecting said beam to the second one of said members, said beam being initially oriented with its axis extending in a reference direction, means for moving said mounting means through a precisely known angular displacement with respect to said support, means for sensing displacement of said beam about said pivot point in response to movement of said one member, and means for moving said pivot point to reorient said beam axis to said reference direction.

6. Apparatus for measuring eccentricity between the rotor and stator of an electrical device, said rotor having an axis of relative rotation with respect to said stator including in combination an indexing head carried by said support and adapted to be moved through a precisely known angular displacement with respect to said support, means mounting one of said rotor and stator on said indexing head for movement therewith, a beam, means carried by said support for suspending said beam for movement about a pivot point located along the length of said beam, means connecting said beam to the other one of said rotor and stator, means for moving said indexing head through a precisely known angle with respect to said support and means for sensing movement of said beam about said pivot point in response to movement of said indexing head.

7. Apparatus for compensating for eccentricity between a pair of relatively rotatable members having an axis of relative rotation including in combination a support, an indexing head carried by said support and adapted to be actuated to move through a precisely known angular displacement with respect to said support, a beam, means carried by said support for suspending said beam for movement about a pivot point along the length of said beam, means connecting said beam to the other of said members, said beam being initially oriented to a reference direction, means for moving said indexing head through a precisely known angle with respect to said support, means for sensing displacement of said beam about its pivot point and means for shifting said pivot point to return said beam to said reference direction.

8. Apparatus for compensating for eccentricity between a pair of relatively rotatable members having an axis of relative rotation including in combination a support, an indexing head carried by said support and adapted to be actuated to move through a precisely known angular displacement with respect to said support, a beam, means carried by said support for suspending said beam for movement about a pivot point along the length of said beam, means connecting said beam to the other of said members, said beam being initially oriented to a reference direction, means for moving said indexing head through a precisely known angle with respect to said support and a differential device comprising a pair of variable capacitors disposed at spaced locations along the length of said beam for sensing displacement of said beam about its pivot point as a measure of eccentricity between said members.

9. Apparatus for measuring eccentricity between a pair of relatively rotatable members having an axis of relative rotation including in combination an indexing head carried by said support and adapted to be moved through a precisely known angular displacement with respect to said support, means mounting one of said members on said indexing head for movement therewith, a beam, means carried by said support for suspending said beam for movement about a pivot point located along the length of said beam, means connecting said beam to the other one of said members, said beam being initially oriented to a reference direction, means for moving said indexing head through a precisely known angle with respect to said support, means for locking said indexing head in the position to which it has been moved, means for sensing movement of said beam about said pivot point in response to movement of said indexing head and means for shifting said pivot point to return said beam to said reference direction without displacement of the axis of relative rotation of said members.

References Cited in the file of this patent

UNITED STATES PATENTS

| | | |
|---|---|---|
| 934,223 | Scott | May 16, 1908 |
| 2,664,641 | Parnet | Jan. 5, 1954 |
| 2,726,382 | Bell | Dec. 6, 1955 |
| 2,753,112 | Blom-Bakke | July 3, 1956 |

FOREIGN PATENTS

| | | |
|---|---|---|
| 730,843 | France | May 23, 1932 |